United States Patent [19]

Kim et al.

[11] 3,884,875
[45] May 20, 1975

[54] FLUOROCARBON TRIAZINE COMPOUNDS

[75] Inventors: Yung Ki Kim; Ogden R. Pierce, both of Midland, Mich.

[73] Assignee: Dow Corning Corporation, Midland, Mich.

[22] Filed: Apr. 1, 1974

[21] Appl. No.: 456,923

Related U.S. Application Data

[62] Division of Ser. No. 25,579, April 3, 1970, Pat. No. 3,847,916, which is a division of Ser. No. 733,833, June 3, 1968, Pat. No. 3,532,696.

[52] U.S. Cl. ... 260/46.5 E; 260/46.5 G; 260/46.5 P; 260/248 CS
[51] Int. Cl. .............................................. C08f 11/04
[58] Field of Search... 260/46.5 EG, 46.5 P, 248 CS

[56] References Cited
UNITED STATES PATENTS 3,532,696   10/1970   Kim et al. ............................ 260/248
3,847,916   11/1974   Kim et al. ..................... 260/248 CS Primary Examiner—Melvyn I. Marquis
Attorney, Agent, or Firm—Norman E. Lewis

[57] ABSTRACT

The invention provides triazines of the formula

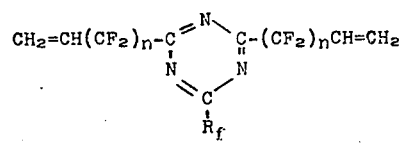

in which $R_f$ is a polyfluorinated alkyl radical of no more than 12 carbon atoms and $n$ has a value of from 1 to 10 inclusive. Fluoroalkylenetriazines containing silanes, silanols and siloxanes are disclosed as fluids, resins and elastomers.

4 Claims, No Drawings

FLUOROCARBON TRIAZINE COMPOUNDS

This application is a division of application Ser. No. 25,579, filed Apr. 3, 1970, now U.S. Pat. No. 3,847,916 which is a division of application Ser. No. 733,833, filed June 3, 1968, now U.S. Pat. No. 3,532,696.

In one aspect the invention relates to vinyl perfluorocarbon triazines. In another aspect the invention relates to polyfluorinated hydrocarbon triazine-containing silanes and silanols. Further, the invention relates to siloxane polymers containing triazine groups.

According to the invention, there are provided triazine compounds of the formula:

(I) 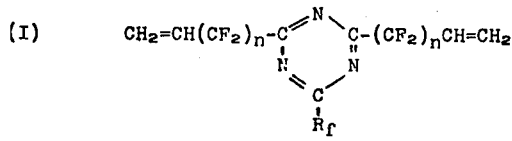

where $R_f$ is a polyfluorinated alkyl radical of no more than 12 carbon atoms and $n$ has a value of from 1 to 10 inclusive.

$R_f$ can be any suitable monovalent fluoroalkyl radical, such as, perfluoroalkyls, for example, trifluoromethyl, iso(heptafluoropropyl), perfluoroisobutyl, perfluorooctyl and perfluorodecyl. Also included are monovalent hydrocarbon radicals partially substituted with fluorine such as trifluoroethyl and 3,3,3-trifluoropropyl and radicals containing bromine or chlorine such as bromodifluoromethyl, chlorodifluoromethyl and chlorodifluoroethyl. $R_f$ is preferably a trifluoromethyl radical. The presence of small amounts of fluoroolefinic radicals provides cross-linking sites in polymers of the above-described triazines.

The triazines of the invention can be prepared by the ammonolysis of vinyl perfluorocarbon nitriles to obtain the corresponding amidine followed by acylation and ring closure utilizing a fluorocarbon acid anhydride to give the divinyl perfluorocarbon triazine structure. The reaction is as follows:

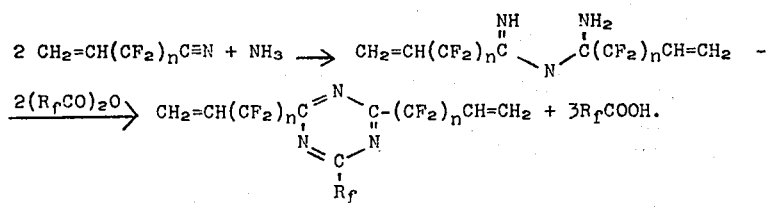

Ammonolysis is carried out at low temperatures, for example, -70°C., while the acylation proceeds at higher temperatures (0° to +40°C.) in the presence of excess anhydride.

The preparation of the alpha-vinyl, omega-nitrile perfluoroalkane is accomplished by reacting ethylene with an omega-bromoperfluoroester, $Br(CF_2)_nCOOR$, in the presence of free radical catalysts, such as peroxides. The reaction is conveniently carried out at a temperature from 110° to 140°C. under 25 to 50 psi pressure. The product from the addition of one ethylene group to the ester is dehydrohalogenated by reaction with an alkali metal alkoxide in alcohol solvent. In carrying out the reaction, the alkoxide of the alcohol corresponding to the R group in the ester is employed and the same alcohol should be used as the solvent.

The nitrile is prepared by conventional reactions from the ester. The ester is hydrolyzed to the acid which is then ammonolyzed to produce the amide, $CH_2=CH(CF_2)_nCONH_2$. The amide can be dehydrated by conventional dehydrating agents, such as $P_2O_5$ or phosphorous pentachloride to obtain $CH_2=CH(CF_2)_nC \equiv N$. This reaction is described in detail in my copending application Ser. No. 598,604, filed Dec. 2, 1966 now Pat. No. 3,503,945.

Examples of the triazine compounds of the invention include the following:

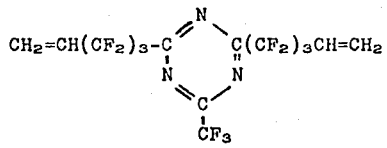

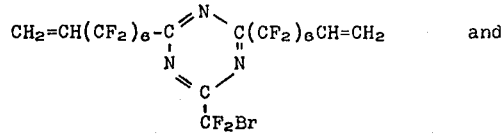  and

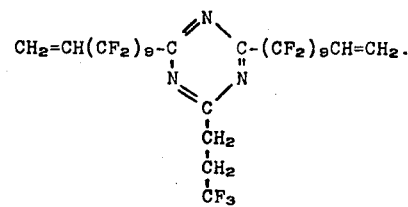

The divinyltriazine compounds of the invention are heat stable fluids and can be utilized as heat transfer media, hydraulic fluids and dielectric fluids.

Further in accordance with the invention, there are provided organosilane and organosilanol compounds of the formula:

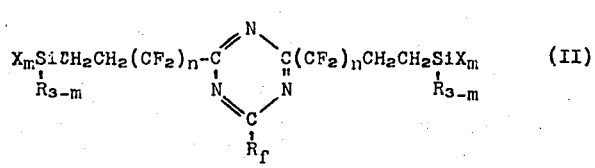 (II)

where X is a hydrogen atom, the hydroxyl group or a hydrolyzable group, R is a monovalent hydrocarbon radical or a $ACH_2CH_2$-radical in which A is a perfluoroalkyl radical, $R_f$ is as defined hereinbefore, $n$ has a value of from 1 to 10 inclusive, $m$ has a value of 0 to 3 inclusive.

The term "hydrolyzable group" means that the group is removed from the Si atom by reaction with water at room temperature. As described above, X can be any hydrolyzable group such as halogen atoms; such as fluorine, chlorine or bromine; hydrocarbonoxy groups such as methoxy, ethoxy, octadecyloxy, allyloxy, cyclohexyloxy, phenoxy, tolyloxy, benzyloxy, $—OCH_2CH_2OCH_3$ and

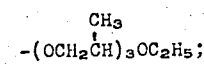

acyloxy groups such as acetoxy, propionyloxy, benzoyloxy, cyclohexoyloxy, and

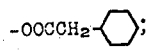

ketoxime groups such as —ON=C(CH$_3$)$_2$ and

amine groups such as —NH$_2$, —N(CH$_3$)$_2$ and

sulfide groups such as —SCH$_3$ and

the nitrile groups, the isocyanate group, sulfate groups such as

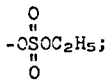

sulfonate groups such as

carbamate groups such as —OOCNHCH$_3$, —OOCN(CH$_3$)$_2$ and —OOCN(C$_2$H$_5$)$_2$ and groups such as —ON(CH$_3$)$_2$ and —ON(C$_3$H$_7$)$_2$.

R can be any monovalent hydrocarbon radical such as alkyl radicals such as methyl, ethyl, isopropyl, t-butyl, octadecyl or myricyl; cycloaliphatic radicals such as cyclohexyl, cyclopentyl and cyclohexenyl; aromatic hydrocarbon radicals such as phenyl, tolyl, xenyl, naphthyl and xylyl; aralkyl hydrocarbon radicals such as benzyl, beta-phenylethyl and beta-phenylpropyl; and alkenyl radicals such as vinyl, allyl, hexenyl, butadienyl or other unsaturated groups including CH ≡ C—.

R can also be any radical of the formula ACH$_2$CH$_2$-in which A is a perfluoroalkyl radical such as CF$_3$, C$_2$F$_5$, C$_8$F$_{17}$, C$_{10}$F$_{21}$, (CF$_3$)$_2$CF— and

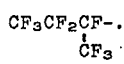

The above described organosilanes and silanols (II) are best prepared by reacting silanes of the formula

with the previously described triazines of the formula (I)

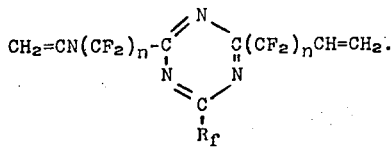

This reaction is carried out in the presence of an excess of platinum catalyst, such as chloroplatinic acid, in the conventional manner for adding SiH compounds to compounds having the terminal CH$_2$=CH group.

The silanols of the invention (i.e. where X is —OH) can be prepared by hydrolyzing the corresponding hydrolyzable silane under neutral conditions by any of the well-known methods such as hydrolysis of those compounds in which X is methoxy.

When R is an alkenyl radical in the silane of the invention, the R group is added to the Si atom by reaction with a Grignard reagent, RMgX, after the vinyl addition reaction.

Examples of the above defined compositions include:

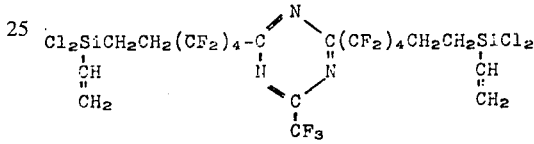

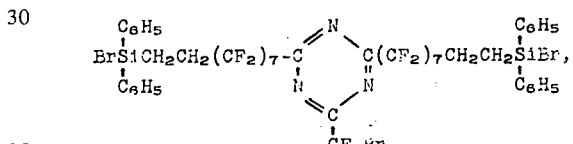

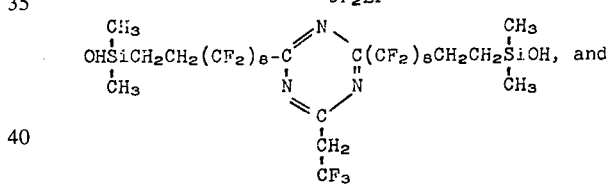

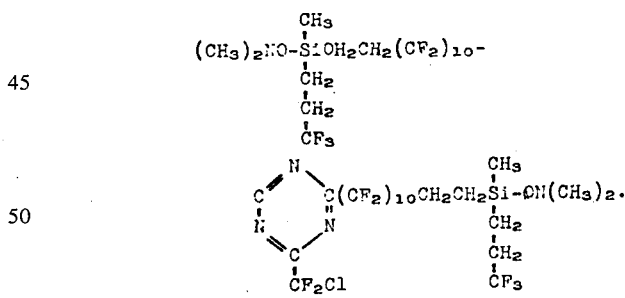

Thirdly, the invention provides siloxanes having at least one unit of the formula

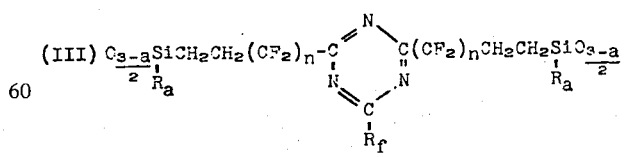

in which R, R$_f$ and $n$ are as described before and each $a$ independently has a value of from 0 to 2 inclusive, any remaining units in the siloxane being of the formula Z$_b$SiO$_{4-b}$/2 in which Z is a hydrocarbon or halohydrocarbon radical, or X group and $b$ has a value of from 0 to 3 inclusive.

The siloxanes of the invention can be prepared by two methods. First is by the hydrolysis or cohydrolysis of the above defined silanes (II), by conventional means, or by cohydrolysis of the defined silanes (II) with silanes of the formula $Z_bSiX_{4-b}$ in which Z, X and $b$ are as defined above. The particular method chosen for hydrolysis or cohydrolysis can vary depending upon the nature of the substituent groups on the silicon. There are no critical conditions other than those for hydrolyzing and cohydrolyzing silanes.

The second method of preparing such siloxanes is by the addition of siloxanes containing SiH groups to the divinyl triazines (I) of the invention in the presence of platinum catalysts. The conditions for carrying out this reaction are those normally employed for the addition of SiH-containing siloxanes to olefins.

As can be seen the siloxanes of the invention can be homopolymers or copolymers of various types of triazine-containing siloxane units. In addition the siloxanes can contain siloxane units of the formula $Z_bSiO_{4-b}$ in which $b$ has a value of from 0 to 3 inclusive. Thus, included are units of the type $SiO_2$, $ZSiO_{3/2}$, $Z_2SiO$ and $Z_3SiO_{1/2}$.

Z can be a hydrogen atom, any of the above defined X groups or any hydrocarbon radical, such as the monovalent radicals specifically shown for R; divalent hydrocarbon radicals such as alkylene radicals, for example, methylene, dimethylene trimethylene or tetramethylene; arylene radicals, for example, phenylene, xenylene, tolylene, xylylene or naphthylene; cycloalkylene radicals, for example, cyclohexylene and cyclopentylene; and alkenyl radicals, for example, vinyl, allyl, hexenyl and butadienyl.

Z can also be any halohydrocarbon radical such as chloromethyl, gamma-chloropropyl, bromo-octadecyl, chlorocyclohexyl, bromocyclohexenyl, 3-chlorobutenyl-4, chlorophenyl, bromoxenyl, 4,4,4-trifluorooctyl, tetrachlorophenyl, p-chlorobenzyl, 3,3,3-trifluoropropyl and $C_{10}F_{24}$—$CH_2CH_2$—.

The siloxanes of the invention are fluids, resins and elastomers. The elastomers are especially useful as sealants where a wide range of temperature stability and chemical inertness are required The following examples are illustrative of the compositions of the invention and should not be construed as unduly limiting the invention, which is properly delineated in the appended claims.

EXAMPLE 1

A mixture of 162.0 g. (1.06 moles) of $CH_2=CHCF_2CF_2CN$ and 9.4 g. (0.55 mole) of dry ammonia in 250 ml. of dry methylene chloride was stirred slowly at room temperature for 8 hours under a cooling condenser. The reaction mixture was kept at room temperature for 36 hours without stirring and was then added slowly into a stirred mixture of 290.0 g. (1.38 moles) of trifluoroacetic anhydride and 400 ml. of dry methylene chloride at 0° to 5°C. This mixture was kept at room-temperature for 18 hours and then poured into twice its volume of ice cold water. The methylene chloride layer was separated, washed with water, and dried over Drierite.

After evaporation of methylene chloride, the resulting product was distilled to yield 160.0 g. (72.8% yield) of the pure divinyltriazine, b.p. 110° to 111°C. (22 mm.), $n_D^{25}$ 1.3785. The molecular weight by mass spectroscopy was found to be 401 (cal. 401). The elemental analysis, $F^{19}$ and $H^1$ resonance, and infrared spectral properties showed the structure to be

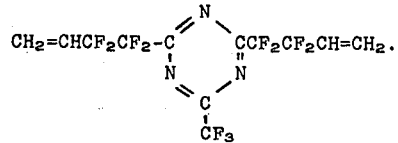

EXAMPLE 2

Into a stirred mixture of 90 g. (0.223 mole) of

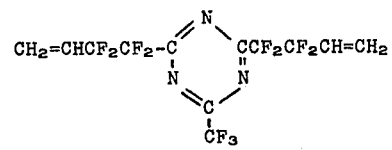

and 157 g. (0.892 mole) of ,3,3,3-trifluoropropylmethylchlorosilane was added 4.2 ml. of 0.1 M solution of chloroplatinic acid in isopropyl alcohol. The mixture was heated while stirring under reflux. At end of 16 hours of reflux an additional 2.5 ml. of 0.1 M solution of chloroplatinic acid in isopropyl alcohol was introduced, and the reaction mixture was continuously heated under reflux for a total of 87 hours. The excess 3,3,3-trifluoropropylmethylchlorosilane and volatile materials were stripped off in vacuo at room-temperature. The resulting crude product (148 g.) was fractionated to yield

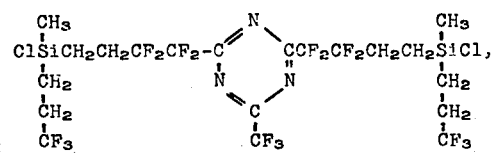

$n_D^{25}$ 1.4050. The elemental analysis and spectral properties ($F^{19}$ and $H^1$ n.m.r. and I.R.) were consistent with the diadduct.

EXAMPLE 3

Utilizing the method of Example 2, about 16 hours of reflux of a solution of

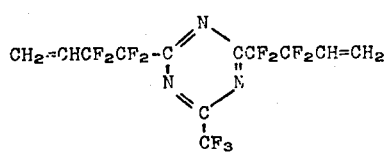

(1.5 g., 0.0037 mole), 3,3,3-trifluoropropylmethylchlorosilane (2.0 g., 0.011 mole), and 50 μl. of 0.1 M solution of chloroplatinic acid in isopropyl alcohol gave 45% yield of

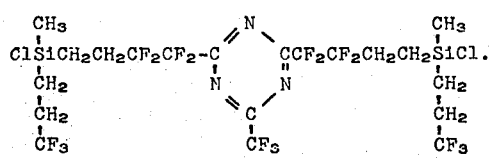

EXAMPLE 4

About 29 hours of gamma-irradiation (1.6 Mrad per hour at 160°C.) of a solution containing 5.0 g. (0.013 mole) of

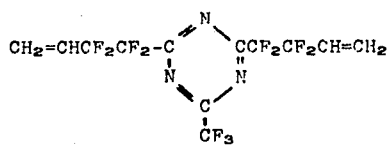

and 7.6 g. (0.043 mole) of 3,3,3-trifluoropropylmethylchlorosilane gave

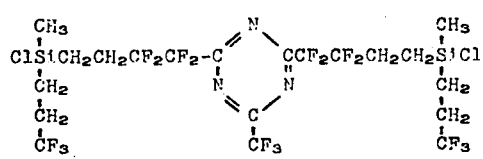

EXAMPLE 5

Fourteen grams of

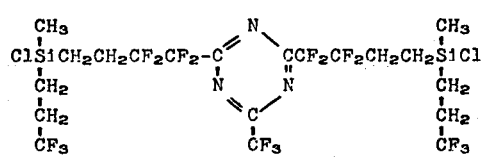

in 70 ml. of ether were added to 120 ml. of saturated aqueous sodium bicarbonate solution while stirring at room-temperature. After stirring for 1.5 hours, the ether solution was separated, washed with 5% aqueous sodium chloride solution, and dried over Drierite. After evaporation of ether under vacuum the resulting viscous liquid product was placed under vacuum at room-temperature for 24 hours to remove volatile materials such as solvents. A yield 13 g. of

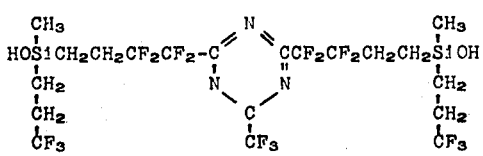

was obtained. The molecular weight by the vapor phase osmometry was found to be 795 (calcd. 717), nd the hydroxy content was found to be 4.52% (calcd. 4.74%). The spectral data were in agreement with the diol structure.

EXAMPLE 6

A mixture of 19 g. of

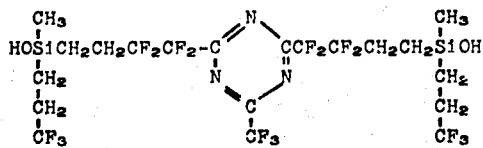

and 5 drops of tetramethylguanidine-trifluoroacetic acid solution was heated while mixing by rotation at 70° to 75°C. under ~15 mm. Hg. for 27 hours, at 80°C. under 0.3 mm. Hg. for 16 hours, and then at 100°C. under 0.2 mm. Hg. for 45 minutes. The resulting polymer was 17.5 g. of rubbery gum having the structure shown below:

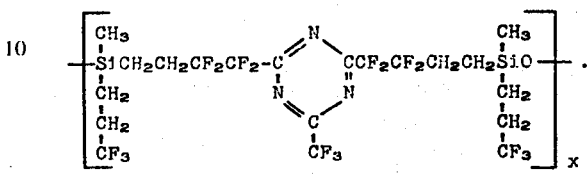

The polymerization catalyst (tetramethylguanidine-trifluoroacetic acid solution) was removed from the rubbery polymer in the following manner: The polymer was dissolved in isopropyl acetate, treated with acidic synthetic resin, washed with water, and dried over Drierite. Evaporation of isopropyl acetate gave the catalyst-free rubbery gum.

EXAMPLE 7

A mixture of 25.0 g. (0.0624 mole) of

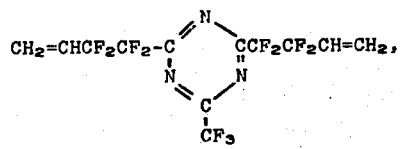

19.4 g. (0.0650 mole) of

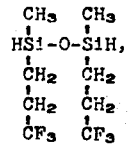

and 250 ml. of 0.1 M solution of chloroplatinic acid in isopropyl alcohol was placed in an evacuated sealed glass ampule. The ampule was heated at 190°C. for 72 hours while rocking end-to-end. Distillation of the reaction product gave clear viscous liquid, b.p. 183° to 184°C. (2.15 mm), $n_D^{25}$ 1.3875. Higher molecular weight polymer remained as residue of the distillation.

EXAMPLE 8

The ultraviolet irradiation of an equimolar mixture of

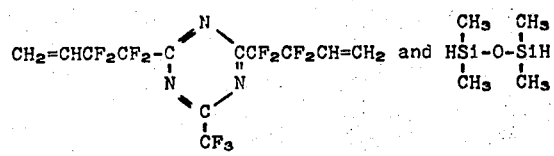

in the presence of a catalytic amount of di-t-butylperoxide resulted in a viscous liquid product at the end of 13 days.

A viscous liquid product was obtained from

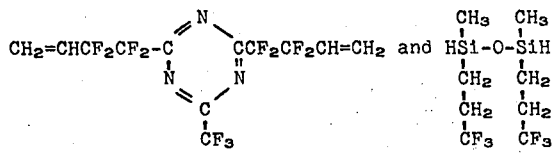 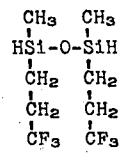

by similar methods.

EXAMPLE 9

When 50 mol percent of

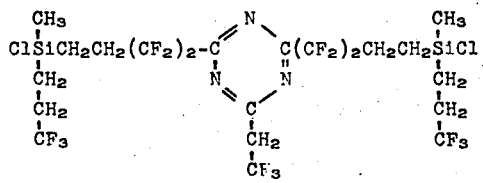

is cohydrolyzed with 25 mol percent $(CH_3)_2SiCl_2$ and 25 mol percent of $C_6H_5SiCl_3$ in the presence of water, the following copolymer is obtained: 50 mol percent of

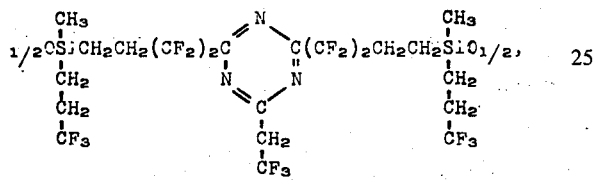

25 mol percent of $(CH_3)_2SiO$ units and 25 mol percent of $C_6H_5SiO_{3/2}$ units.

EXAMPLE 10

When 50 mole percent of the triazine-containing silane used in Example 9 is cohydrolyzed with 50 mole percent $(CH_3)_3SiCl$ a fluid copolymer having the following composition is obtained: 50 mole percent

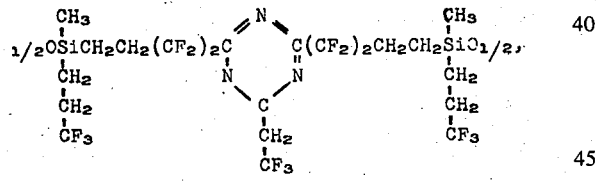

and 50 mole percent $(CH_3)_2SiO_{1/2}$ units.

EXAMPLE 11

When

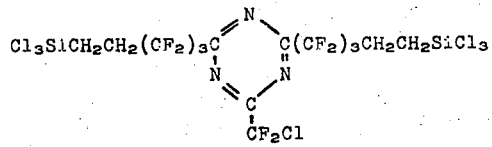

is reacted with $CH_2=CHCH_2MgCl$, the following composition is obtained:

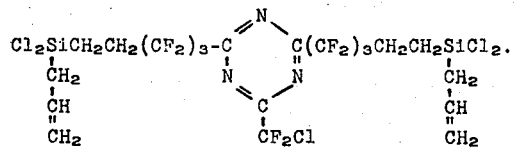

Hydrolysis of this silane produces a siloxane which is readily vulcanized.

That which is claimed is:

1. A siloxane having at least one unit of the formula

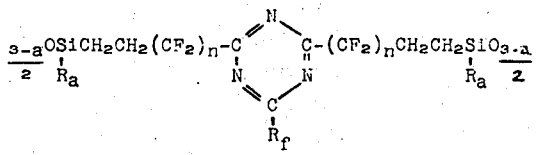

$R_f$ is a polyfluorinated alkyl radical of no more than 12 carbon atoms,

R is a monovalent hydrocarbon radical or an $ACH_2CH_2$ radical in which A is a perfluoroalkyl radical;

$n$ has a value of from 1 to 10 inclusive, and each $a$ independently has a value of from 0 to 2 inclusive; and remaining units being of the formula $Z_b$-$SiO_{4-b/2}$ in which Z is a hydrocarbon or halohydrocarbon radical, a hydrogen atom, the hydroxyl group or a hydrolyzable group, and $b$ has a value of from 0 to 3 inclusive.

2. The siloxane of claim 1 wherein
   $R_f$ is a trifluoromethyl radical,
   R is a 3,3,3-trifluoropropyl radical,
   $a$ has a value of 2, and
   $n$ has a value of 2.

3. The siloxane of claim 1 wherein $R_f$ is a bromodifluoromethyl radical.

4. The siloxane of claim 1 wherein $R_f$ is a trifluoromethyl radical, R is a methyl radical, $a$ has a value of 2, and $n$ has a value of 2.

* * * * *